United States Patent [19]

McGuffin et al.

[11] 3,803,672
[45] Apr. 16, 1974

[54] APPARATUS FOR PRODUCING HIGH MODULUS GRAPHITE MATERIALS

[75] Inventors: Donald W. McGuffin; Richard J. Larsen, both of Torrance; Robert W. Mitchell, Hawthorne; Bernard E. Caruso, Upland, all of Calif.

[73] Assignee: Hitco, Gardena, Calif.

[22] Filed: Apr. 13, 1971

[21] Appl. No.: 133,584

[52] U.S. Cl. ................................................. 26/68
[51] Int. Cl. ............................................... D06c 3/00
[58] Field of Search .... 23/260, 262, 209.1 F, 209.4; 264/288, DIG. 19, 29; 263/3 US; 68/5 D, 115.5 US; 26/54, 68

[56] References Cited
UNITED STATES PATENTS

| | | | |
|---|---|---|---|
| 2,824,383 | 2/1958 | Machalek | 26/68 X |
| 3,243,845 | 4/1966 | Cassel | 26/54 UX |
| 3,517,425 | 6/1970 | Hunter | 26/54 |

Primary Examiner—Robert R. Mackey
Attorney, Agent, or Firm—Marvin E. Jacobs

[57] ABSTRACT

A continuous web process and apparatus for manufacturing high modulus graphite fibers and fabric are disclosed. Precursor fabric is incrementally stretched dynamically by applying an initially high tension to the fabric and heating the fabric to stretching temperature while maintaining the stretch ratio substantially constant. The tension is then reduced to a low value before preoxidation temperature is reached and increases during preoxidation to a higher value due to shrinking and/or application of tension to the fabric. The fabric is then continuously fired and graphitized. The stretching unit includes a plurality of rolls successively driven at a controlled faster speed and successively heated to a higher temperature. The fabric is heated quickly between each roll to a temperature intermediate to the temperature of the rolls by applying a jet of hot air to the fabric from a hot air sparger air knife so that substantially all the stretching occurs during the interoll travel.

8 Claims, 13 Drawing Figures

INVENTORS.
DONALD W. McGUFFIN
RICHARD J. LARSEN
BY ROBERT W. MITCHELL
BERNARD E. CARUSO

ATTORNEYS.

APPARATUS FOR PRODUCING HIGH MODULUS GRAPHITE MATERIALS

BACKGROUND OF THE INVENTION

1. Field of the Invention

The present invention relates to the preparation of high modulus material, and, more particularly, to methods and apparatus for continuous processing of woven polyacrylonitrile (P.A.N.) fabrics through particular process steps wherein the woven fabrics are converted to carbon and graphite products, and especially to continuously processed, high modulus, woven graphite products.

2. Description of the Prior Art

Graphite and carbon fibers, filaments or yarns are presently being produced in continuous or discontinuous lengths. Continuous lengths can be processed at lower cost since the material is handled less and unit process times are reduced. However, the high price of continuous fibers has led to the dominant use of discontinuous materials even though the discontinuous materials must be coated by hand lay-up techniques. The high cost of continuous fiber is the result of very high temperatures required for processing coupled with a tendency of the fiber to break during processing under tension, and the need for separate expensive machines for each yarn processed. The breaking tendency has further precluded the continuous processing of pre-woven precursor material. The application of carbon and graphite fibers is being seriously inhibited by the high cost and limited availability of the material.

The procedure for converting an organic precursor fiber into a high strength, high modulus fiber is rather complex. While much progress has been made in determining structure-property relationships of carbon-graphite materials, there is much remaining to be done in order to understand the effect of production parameters on fiber structure and properties.

The beneficial effects of stretching during various stages of processing has been reported by many workers in this field. Although carbon-graphite fibers are polycrystalline, they exhibit a high degree of preferred orientation which polycrystalline materials do not generally possess. The preferential arrangement of hexagonal graphite crystallites parallel to the fiber axis is responsible for the high strength exhibited by some of the currently available fibers. This high degree of orientation of the crystallites is probably due to the fact that the molecular chains in the precursor are oriented parallel to the fiber axis during stretching and therefore, the graphitic nuclei will be more oriented.

Application of stress during some stage of the processing is required to develop high tensile strength levels. Both temperature and stress levels are important. It also has been found that oxidation of carbon-graphite precursor, especially of the acrylic type, prior to carbonization or graphitization is necessry to increase both the strength properties and weight yield of the final product. Stretching or restricting the filaments from shrinking has also been found to be beneficial during preoxidation.

The term preoxidation is not accurately descriptive of this process step since two distinct chemical changes occur in the polymer during this step. Under application of heat, the polymer cyclizes, that is, forms a six member hexagon ring similar to that found in graphite. Heating in an oxygen containing atmosphere allows oxygen to diffuse into the structure of the fiber and form cross-links or chemical bonds between the polymer chains. It has been fairly well established that the final product characteristics of a graphite yarn or fabric are determined primarily by what happens during the preoxidation step. There are four critical parameters that have to be controlled during preoxidation, i.e., temperature, time, tension or stretch, and atmosphere composition. These parameters are very interrelated and will determine in the preoxidized material the amount of cyclization, cross-linking, oxygen content and orientation.

However, up to date, these parameters have not been simultaneously controlled during preoxidation in a manner to optimize properties and minimize the possibility of breakage. Generally, preoxidation stress has been accomplished in batch processing by restraining the filaments or fabrics on racks and relying on shrinking forces, or by applying a constant load to the material during this stage of the processing. Constant high web tension cannot be sustained on the fabric during preoxidation without causing breakage or tearing of the fabric.

SUMMARY OF THE INVENTION

Preoxidation processing is accomplished in accordance with the invention, in a two stage process including a unique stretching unit and oxidation unit. In the stretch unit, an initial high load is applied to the precursor. The unit is zoned into increasingly higher temperature zones. As the breaking strength of the material decreases at higher temperature, the load is decreased in a controlled manner to prevent breaking, preferably by maintaining the stretch ratio constant. In the oxidation unit, the load is again increased by the shrinkage forces built up by cyclization and cross-linking.

The stretching unit includes a plurality of driven rolls, preferably about two to eight, suitably four to six. Each roll is driven by a separate variable speed motor and the speed of each roll is controlled by the following roll. The last roll controls the overall speed of the unit. Thus, as the speed of a roll is decreased, the speed of the preceding roll changes automatically in a preset downward manner. Each roll is separately heated to maintain its temperature at a preselected value. Between each two rolls a heater is positioned to quickly raise the temperature of the precursor. This incrementally relieves stress during travel between rolls to maintain the stretch ratio constant.

Thus, tension is intimately controlled by presetting tension at the unwind stand to an initially high level, and the tension is then controlled by local temperature and stretch levels between rolls. The stretched precursor is then directly and continuously fed to the oxidation unit which can be run at constant temperature and composition or may be zoned at successively higher temperatures and varying composition to control properties and decrease resistance time in the unit.

These and many other features and advantages of the invention will become apparent as the invention becomes better understood by reference to the following detailed description when considered in conjunction with the accompanying drawings.

DESCRIPTION OF THE PREFERRED EMBODIMENTS

High performance carbon-graphite fibers can be prepared from organic precursors such as acrylic polymers, polyvinyl alcohol, regenerated cellulose, pitch materials including petroleum residues, asphalt and coal tars. Highly oriented, synthetic polymer precursors such as acrylic polymers and regenerated cellulose provide better end characteristics. Acrylic precursors do not melt prior to pyrolytic decomposition and strength properties of graphitic fibers produced from acrylic precursors are substantially improved over regenerated cellulose based fibers. In addition to strength properties, other physical properties are improved.

The electrical conductivity is approximately five times that for regenerated cellulose based fibers and the degree of graphitization is substantially increased. This results from the fact that acrylic precursors yield a graphitic type of carbon as compared to the non-graphitic type of carbon produced from cellulosic materials. Furthermore, the carbon yield is approximately 45 percent as compared to only 25 percent from rayon. The volatiles given off from acrylic precursors do not cause fiber sticking such as occurs from rayon based materials so that yarn flexbility and strength are better. Yarn uniformity is more even and processing problems are fewer.

The acrylic precursors may be homopolymers of acrylonitrile of copolymers produced by copolymerizing not less than 85 percent of acrylonitrile with not more than 15 percent of a monovinyl compound such as methacrylate, methylmethacrylate, vinyl-acetate, vinylchloride, vinylidine chloride, 2-methyl-5-pyridine or the like.

The precursor may be treated as filament, staple or batting, but, preferably is woven into continuous lengths of fabric. Many different fabric types may be processed in accordance with the invention and may be either single ply or multiple ply. Since the end product is a unidirectionally oriented, stretched material, the ratio of warp to fill yarns in the raw state is preferably 2/1 to 5/1. A fabric prepared from two ply, 800 denier, 34 count wrap with 1 ply, 200 denier, 40 picks fill fiber has been found to provide high end product tensile strength characteristics, and hence, will be the illustrative fabric referred to in the following description.

Figure 6:
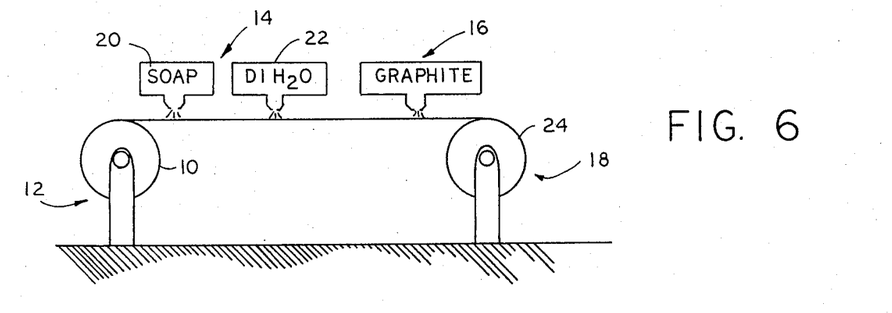
FIG. 6 is a schematic illustration of the preliminary precursor fabric production and preparation stages of the system.

Referring now to FIG. 6, the woven P.A.N. is subjected to two surface pre-treatment steps prior to further processing. In FIG. 6, a roll 10 of P.A.N. fabric is unwound from unwind stand 12 and passes by a washing station 14 and impregnation station 16 before being rewound or rewind stand 18. In the washing station, the fabric is washed to remove the water-soluble sizing applied by the yarn manufacturer to prevent abrasion of the yarn during handling and weaving. This finish must be removed or it will react with the P.A.N. during oxidation and firing resulting in a brittle, weak product. Washing is effected in a multi-stage unit using a warm soap solution sprayed onto the fabric at stage 20. A deionized water rinse is sprayed onto the fabric at station 22. The washing system incorporates pressure sprays and special sparger bars to insure complete penetration through the fabric for complete finish removal. The washed fabric is then impregnated with a lubricant such as colloidal graphite to prevent filament cohesion during further processing. For example, a 4 weight percent colloidal graphite solution can be impregnated onto the fabric from the impregnation station 16 or the pressure sprays or sparger bars of the washing station may be used for the impregnation.

In order to better understand the process of the invention, the typical behavior and response characteristics of P.A.N. fabric during static preoxidation under a variety of general conditions are illustrated in FIGS. 1 through 4. These idealized curves show how P.A.N. fabric behaves under the following conditions for a constant time-temperature cycle.

Figure 1:
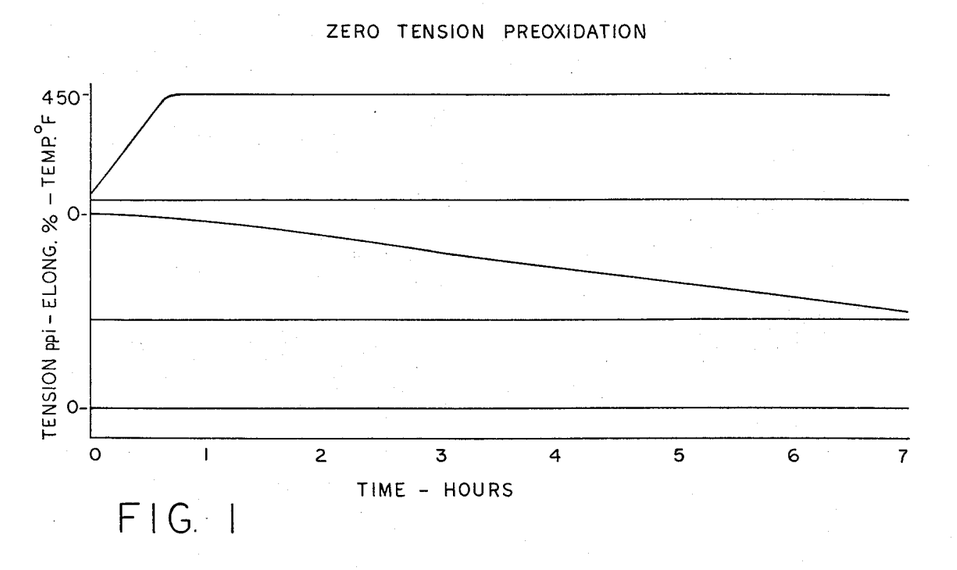
FIG. 1 is a graph of the behavior of P.A.N. precursor fabric during preoxidation at zero applied tension for a constant time-temperature cycle.
Figure 2:
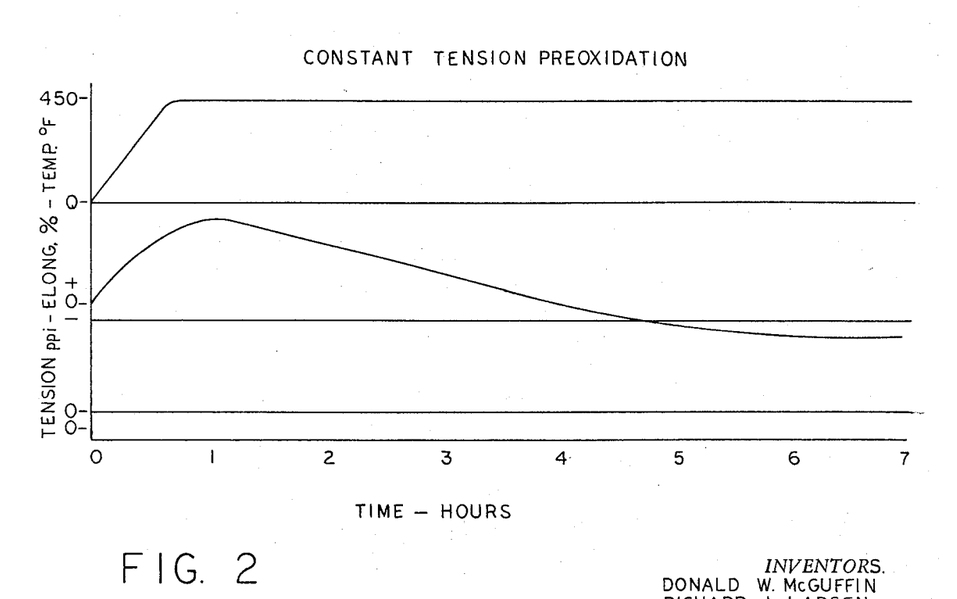
FIG. 2 is a graph of the behavior of P.A.N. precursor fabric during preoxidation at constant applied tension.
Figure 3:
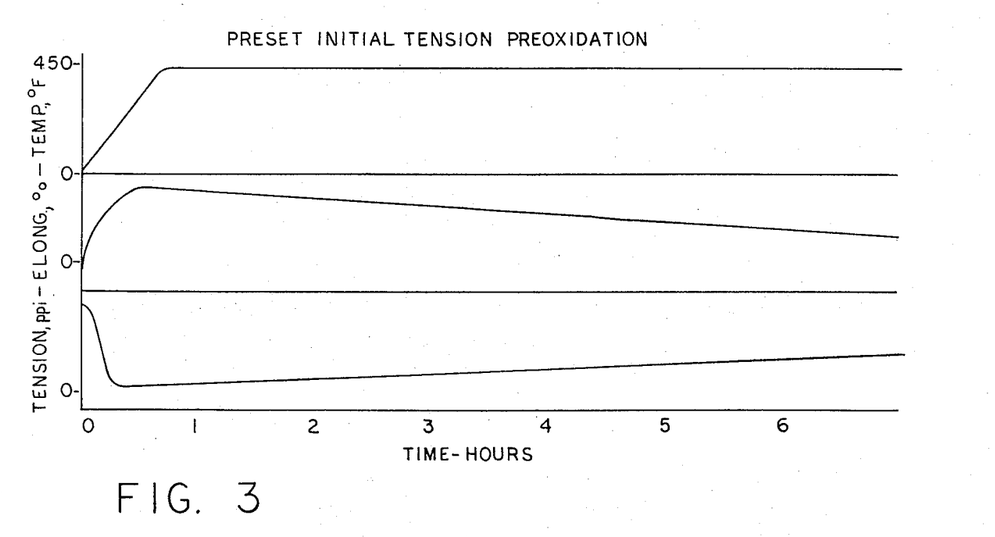
FIG. 3 is a graph of the behavior of P.A.N. precursor fabric during preoxidation at preset initial tension.
Figure 4:
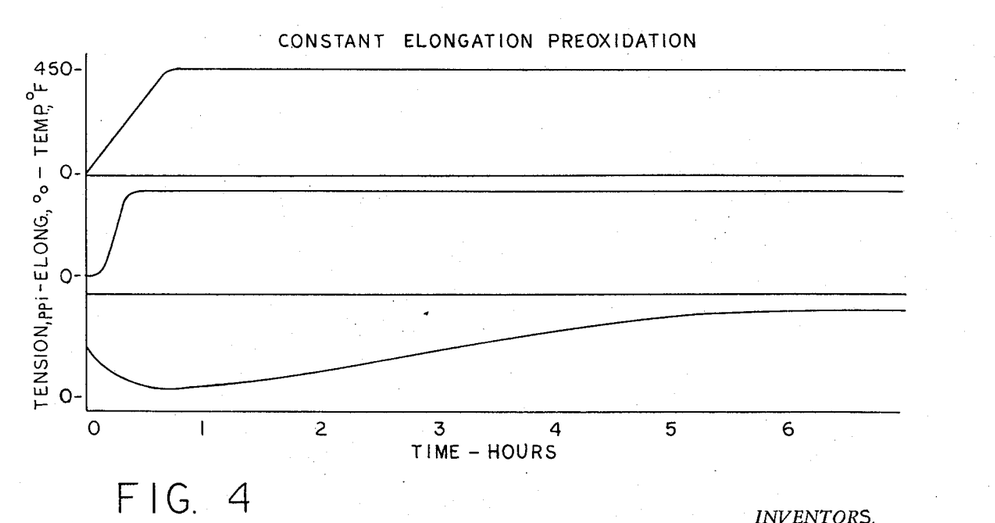
FIG. 4 is a graph of the behavior of P.A.N. precursor fabric during preoxidation at constant elongation.

Referring now to FIG. 1, unrestrained fabric will shrink continually during the cycle. The fact that a stable condition is not reached in the duration of the cycle investigated, would indicate that cyclization and cross-linking are continual. From FIG. 2, it is observed that if constant preoxidation tension loads are applied, the material will initially elongate and then shrink because forces generated during shrinkage are high enough to overcome the applied tension. P.A.N. fabric will initially stretch and shrink during preoxidation when an initial tension load is applied and allowed to change as a function of time, as shown in FIG. 3. FIG. 4 illustrates the behavior of P.A.N. fabric during constant elongation preoxidation stretching.

From experimental data, it can be concluded that there is a maximum web tension that can be applied for a particular fabric at the start of preoxidation if breaks are to be avoided. Extremely high tension levels can be applied initially to the fabric to achieve an elongation level of 50 percent and preferably 20 to 40 percent without adverse effect, if the tension is permitted to decline as elongation takes place. For the illustrative fabric, for example, the maximum permissible web tension is 10 pounds per inch (p.p.i.).

Prestressing to orient or elongate the illustrative fabric at a temperature level of 200°F is possible up to values of 10 percent or more and little if any, shrinkage takes place at a temperature level of 200°F. Significant tension levels in the range of 30–35 p.p.i. are required to maintain the degree of elongation (10 to 40 percent initially achieved in P.A.N. fabric). Significant tension levels are developed by the fabric shrinkage during preoxidation. Elongation levels appear to be directly related to web tension at temperature levels of 200°F and 450°F.

Optimum conditions for processing prewoven precursor fabric in accordance with the invention are achieved by initially applying a high tension load to the fabric to achieve a particular level of elongation or orientation. This portion of the process accomplishes the results shown in the initial period of about one-half hour in the graph of FIG. 3. Since after stretching the strength of the fabric is reduced, the tension must be reduced to below breaking strength. During cyclization and cross-linking, shrinkage forces are building up at a slow rate, therefore, the load must be increased to offset these forces occuring at a slower rate than stretching.

Controlled tension relief to prevent shrinking and loss of orientation is accomplished in accordance with the invention by stepwise dynamic stretching of the continuously moving fabric under substantially constant elongation conditions. This processing accomplishes the results illustrated in the portion of the graph of FIG. 4 after the initial period of about one-half hour. The fabric is stretched to an initial high load condition to achieve the desired level of orientation and elongation. Typically, a tension between 30–100 p.p.i. is applied to the cold fabric.

The stretched fabric is then subjected to stepwise incremental multi-stage dynamic stretching. However, since the strength of the fabric declines as the temperature is increased, the tension on the fbric is incrementally reduced by zoned stepwise stretching of the dynamically moving fabric up to about 450°F, the temperature at which cross-linking and cyclization is initiated. The tension on the fabric at the end of the multi-state dynamic stretching is reduced to a low value but above 0, since the fabric would shrink too much and lose orientation. The tension cannot be too high since the breaking strength is low and the fabric would tear. The tension on the illustrative fabric at this stage is suitably between 5 to 20 p.p.i., most preferably below 10 p.p.i.

The elongated precursor fabric is then subjected to cross-linking in the oxidation unit. The temperature in the unit is maintained between 400°F and about 525°F, and may be controlled at constant temperature within that range or may be gradually or incrementally increased to maximum temperature. Suitably, the unit may be zoned in two or three different compartments at increasingly higher temperatures such as 450, 500 and 525°F. The preoxidized fabric suitably contains about 5 to 25 percent oxygen, preferably about 12 to 16 percent oxygen after treatment during a typical residence time of 0.5 to 6 hours. The oxygen content may be constant throughout the unit or may be maintained at different levels within the zones, as discussed. Metal ion oxidation catalysts may be present in the unit to increase the rate of oxidation, permitting lower temperatures and/or shorter residence time.

The catalysts may be of the direct metal-ion catalysis of air oxidation type such as cobalt, nickel, rhodium, manganese, chromium, copper, silver and cerium or of the type that provide chemically enhanced oxidation. Periodates, peroxides, permanganates, dichromates and perchlorates are typical of the latter type of compounds.

As discussed above, shrinkage occurring during cyclization and cross-linking develops tension. A tension level of about 14 p.p.i. for the illustrative fabric is generated when the fabric is permitted to shrink about 16 percent during preoxidation. However, the fabric breaking strength increases during oxidation and in order to maintain the elongation and orientation, the tension is increased from about 10 ppi to about 20 to 50 p.p.i., suitably around 25 to 35 ppi during oxidation. The fabric is now cooled to a low temperature below about 100°F and suitably to room temperature and may be retensioned up to about 80 p.p.i. before being subjected to firing and graphitization.

Figure 7:
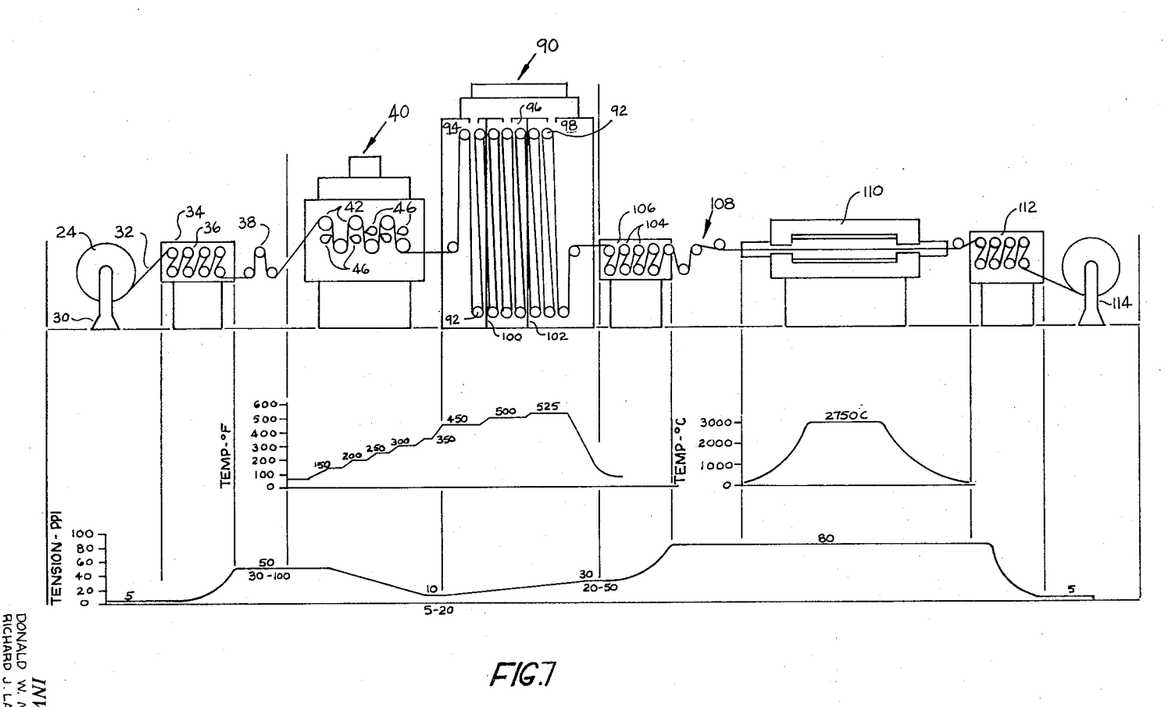
FIG. 7 is a schematic illustration of the complete system of the present invention.

Referring now to FIG. 7, the upper portion of the figure illustrates a sequential train of equipment for providing the constant elongation, constant stretch ratio, stretching and oxidation units and firing/graphitization unit of the continuous graphite producing apparatus of the invention. The lower portion of the figure is a graphical history of the tension and temperature of a typical P.A.N. fabric as it travels through the apparatus.

The unwind stand 30 receives a roll 24 of washed and colloidal graphite impregnated fabric as processed in FIG. 6. The unwind stand may be braked to apply an initial tension load of about 5 p.p.i. to the fabric 32. The initial speed may be up to about 35 inches per minute and is usually about 4 to 8 inches per minute. The fabric then enters a tensioning unit 34 containing a plurality of braked rolls 36. The tension is increased up to about 20 to 100 p.p.i. in this unit. The fabric 34 may then travel through a set of tension sensing rolls 38 before entering the stretch unit 40. The unit 40 contains a plurality of independently driven rolls 42. Each roll is driven by a separate variable speed motor.

Figures 8, 9:
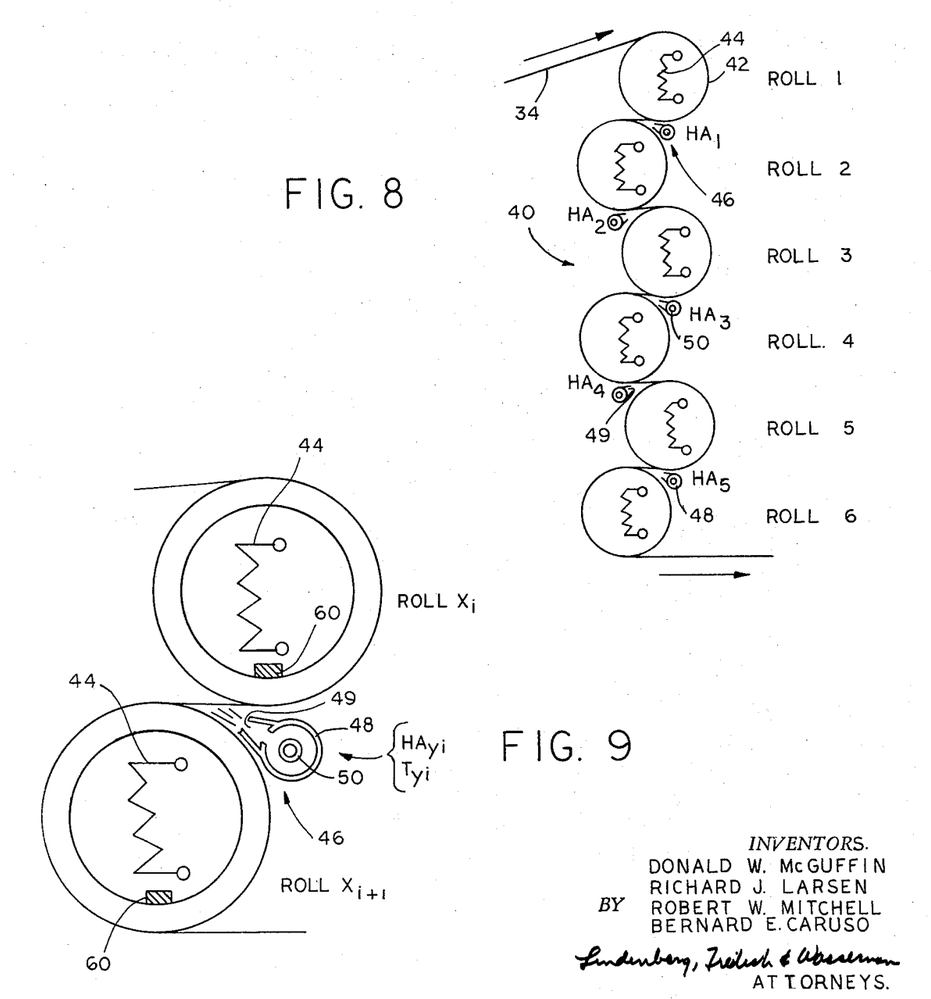
FIG. 8 is an enlarged schematic detailed view of the stretcher unit of the invention.
FIG. 9 is an enlarged end view of a set of rolls and intermediate hot air sparger of the stretcher unit of the invention.

Referring now to FIG. 8, a six roll stretcher 40 is illustrated incorporating five stretch points between the rolls. The rolls are arranged to provide a wide wrap of fabric to prevent necking down and breakage of the fabric as it is heated and stress relieved as it passes between rolls. The rolls are suitably arranged in alternate rows on spaced axial lines, the axial lines being separated by the radius of a roll to provide an S-wrap. The rolls are heated by internal resistance heaters 44. A heater 46 such as a hot air sparger (HA) is disposed between each set of rolls for heating the fabric to a temperature intermediate that of the set of rolls. The hot air sparger comprises a cylindrical tube 48 having an elongated narrow slot nozzle 49 on one side thereof and an internal resistance heater 50 so as to direct a controlled blast of hot air at the fabric between the two rolls. If the rolls are numbered 1 to 6 in FIG. 8, the speeds can then be indicated as $S_{1-6}$, the temperatures as $T_{1-6}$, the spargers can be indicated as $HA_{1-5}$ and the sparger temperatures would then be indicated as $THA_{1-5}$.

Figure 11:
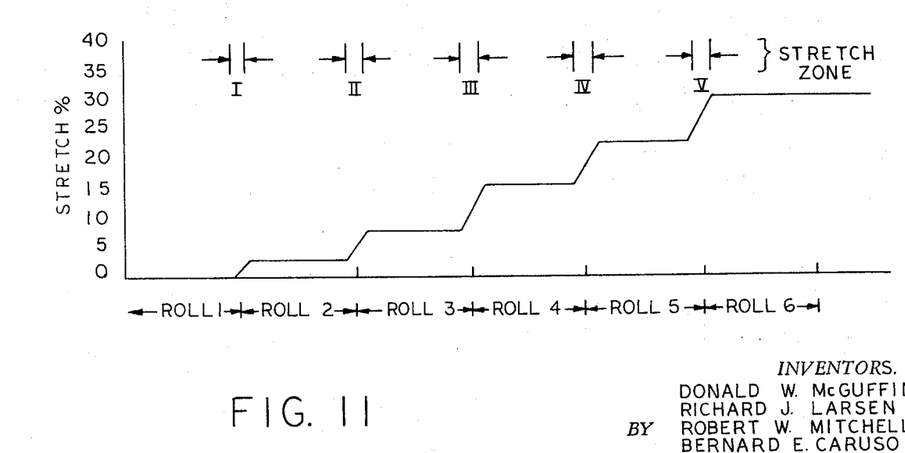
FIG. 11 is a graph of the stretch staging accomplished in the stretcher unit of the invention.
Figure 12:
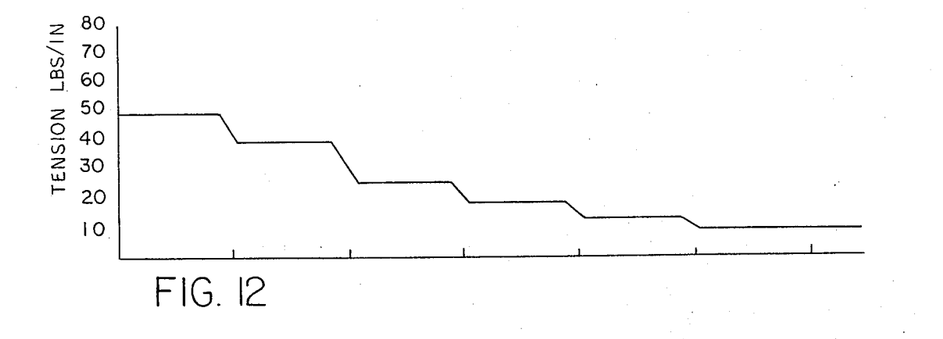
FIG. 12 is a graph of the tension staging accomplished in the stretcher unit of the invention.
Figure 13:
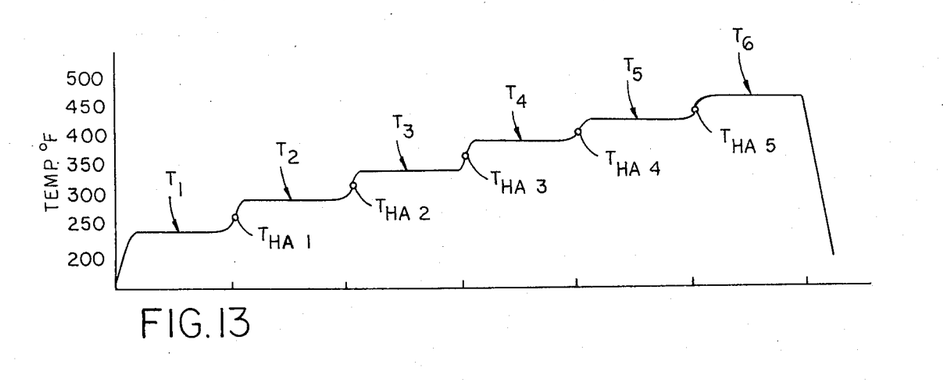
FIG. 13 is a graph of the temperature staging accomplished in the stretcher unit of the invention.

The temperature and speed histories of the fabric through the unit are indicated in Table I and as shown in FIG. 11.

TABLE I

Roll 1: Speed $S_1$, Temp $T_1$

Stretch=$S_2-S_1$; Sparger Temp $T_{HA1}$
Roll 2: Speed $S_2$, Temp $T_2$
  Stretch=$S_3-S_2$; Sparger Temp $T_{HA2}$
Roll 3: Speed $S_3$, Temp $T_3$
  Stretch=$S_4-S_3$; Sparger Temp $T_{HA3}$
Roll 4: Speed $S_4$, Temp $T_4$
  Stretch=$S_5-S_4$; Sparger Temp $T_{HA4}$
Roll 5: Speed $S_5$, Temp $T_5$
  Stretch=$S_6-S_5$; Sparger Temp $T_{HA5}$
Roll 6: Speed $S_6$, Temp $T_6$
TEMPERATURE HISTORY:

$T_1 \leqslant T_{HA1} \leqslant T_2 \leqslant T_{HA2} \leqslant T_3 \leqslant T_{HA3} \leqslant T_4 \leqslant T_{HA4} \leqslant T_5 \leqslant T_{HA5} \leqslant T_6$ SPEED HISTORY: $S_1 \leqslant S_2 \leqslant S_3 \leqslant S_4 \leqslant S_5 \leqslant S_6$

| STRETCH HISTORY: | $S_2-S_1$ | $S_3-S_2$ | $S_4-S_3$ | $S_5-S_4$ | $S_6-S_5$ |
|---|---|---|---|---|---|
| STRETCH POINT | I | II | III | IV | V |

The degree of stretch is at all times proportional to the speed differential between adjacent rolls, assuming no slippage or fabric breakage.

Figure 10:
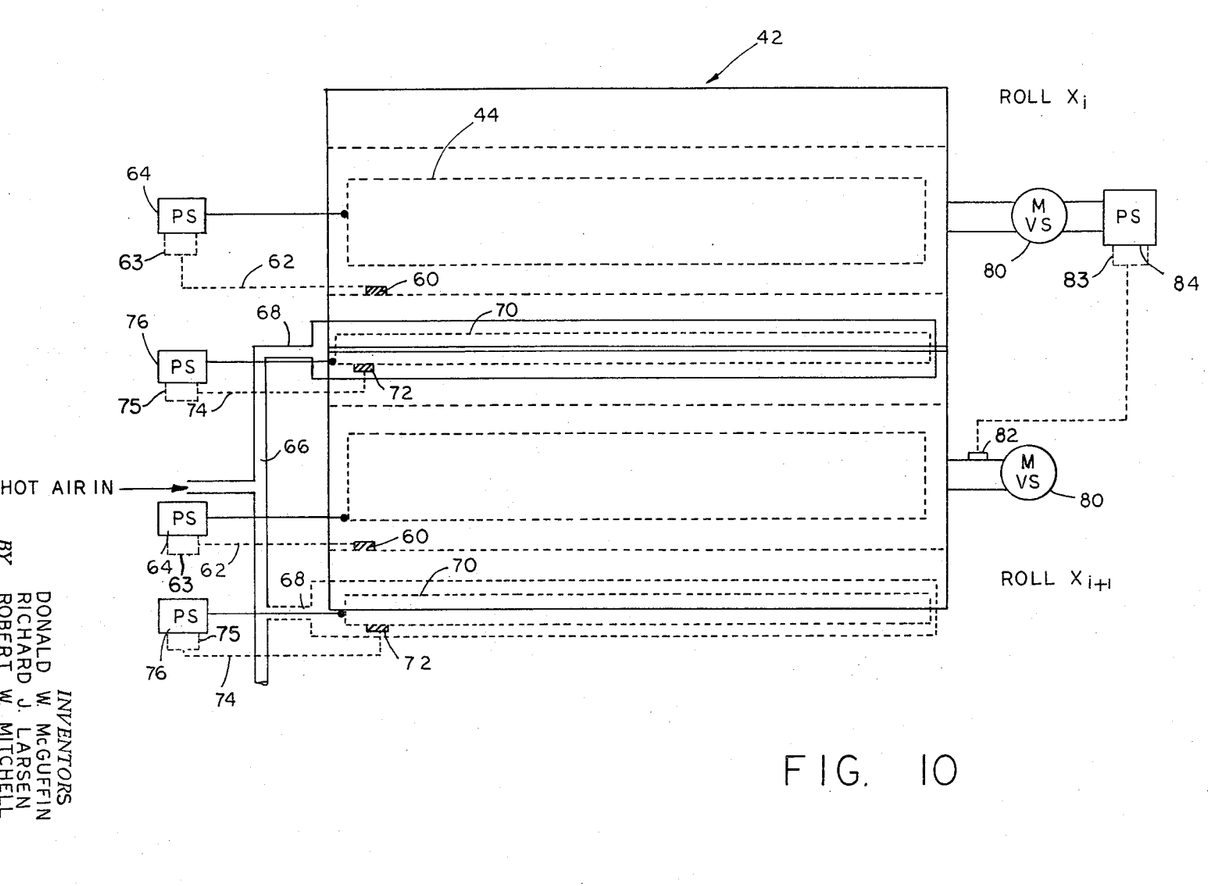
FIG. 10 is an enlarged front view of the rolls of FIG. 9.

Referring now to FIGS. 9 and 10, enlarged side and front views of any two rolls, $x_i$ and $x_i+1$ are illustrated. Each roll contains a temperature sensing element 60 such as a thermocouple applied to the internal surface of the hollow roll 42. The signal from the thermocouple 60 is applied by means of conductors 62 to the control element 63 which controls the power supply 64 for heating the cartridge heater 44. The cylindrical hot air spargers 46 are supplied by hot air from a manifold 66 through branch takeoffs 68. The air is heated up to the desired temperature by means of an internal resistance heater 70. Temperature sensing elements such as a thermocouple 72 senses the temperature of the heated air and applies a control signal through conductors 74 and control element 75 to the power supply 76 for the cartridge heater 70. Each roll 42 is driven by a separate variable speed motor 80. The speed(s) of the following roll, roll $x_{i+1}$ is sensed by a speed determining instrument 82 such as tachometer and the signal from the instrument 82 is applied through control element 83 to the power supply 84 for the preceeding roll, $x_i$ to control its speed at the desired preset ratio. The master roll such as No. 6 in the unit of FIG. 8 controls the overall speed of the system. Thus, as the speed of a roll is increased or decreased the speed of the preceeding roll changes automatically according to a preset ratio.

In any case, the speed of the initial roll $S_{xi}$ is less than the speed of the succeeding roll, $S_{xi+1}$ and the percent stretch equals $[(S_{xi+1} - S_{xi})/S_{xi}] \times 100$. The temperature history would increase in a controlled manner in that $T_{xi+1}$ is greater than $T_{xi}$ which is greater than $T_{xi}$. Stretching in each zone is adjusted by the relative speed of the rolls and tension is relieved by heating. The tension is maintained below the breaking strength of the fabric at that instant. The temperature of each roll and sparger should be controlled within ±5°F to assure that the tension does not increase above the breaking strength at any instant, and to maintain the stretch ratio constant in each zone. Though the specific temperature history indicated in FIGS. 7 and 11 show an even 50°F differential between each roll, the temperature differentials may be higher or lower depending on the breaking strength and relative speeds to provide the desired constant stretch ratio throughout the zones of the unit.

Referring again to FIG. 7, the stretched material leaves unit 40 at a temperature 450°F and a typical tension of about 10 p.p.i. It then enters the oxidation unit 90. The unit 90 contains a plurality of driven rolls 92 and may be divided into zones 94, 96 and 98 by means of compartment walls 100 and 102. The temperature within the unit is maintained between about 450 and 525°F and may be controlled at a constant temperature within that range or zoned into incrementally higher temperatures as indicated.

During oxidation, the tension of the fabric increases from about 5 to 20 p.p.i. to about 20 to 50 p.p.i., suitably about 30 p.p.i. The tension is increased by the driven rolls 104 of the tensioning unit 106. The fabric is allowed to cool and the tension is increased to about 80 p.p.i. before the fabric enters the firing/graphitization unit 110. The tension on the fabric is sensed by tension sensing roll 108 before it enters the unit 110. The fabric is fired for 0.5 to 10 minutes at a temperature above 2,000°C up to about 3,000°C during graphitization, suitably at about 2,750°C for about 0.5 to 10 minutes in an inert atmosphere. A tensioning unit 112 at the end of the graphitization unit 110 may be utilized to apply tension up to 80 p.p.i, to the fabric during graphitization. When firing is completed, the fabric is cooled and rewound on a driven rewind stand 114.

Figure 5:
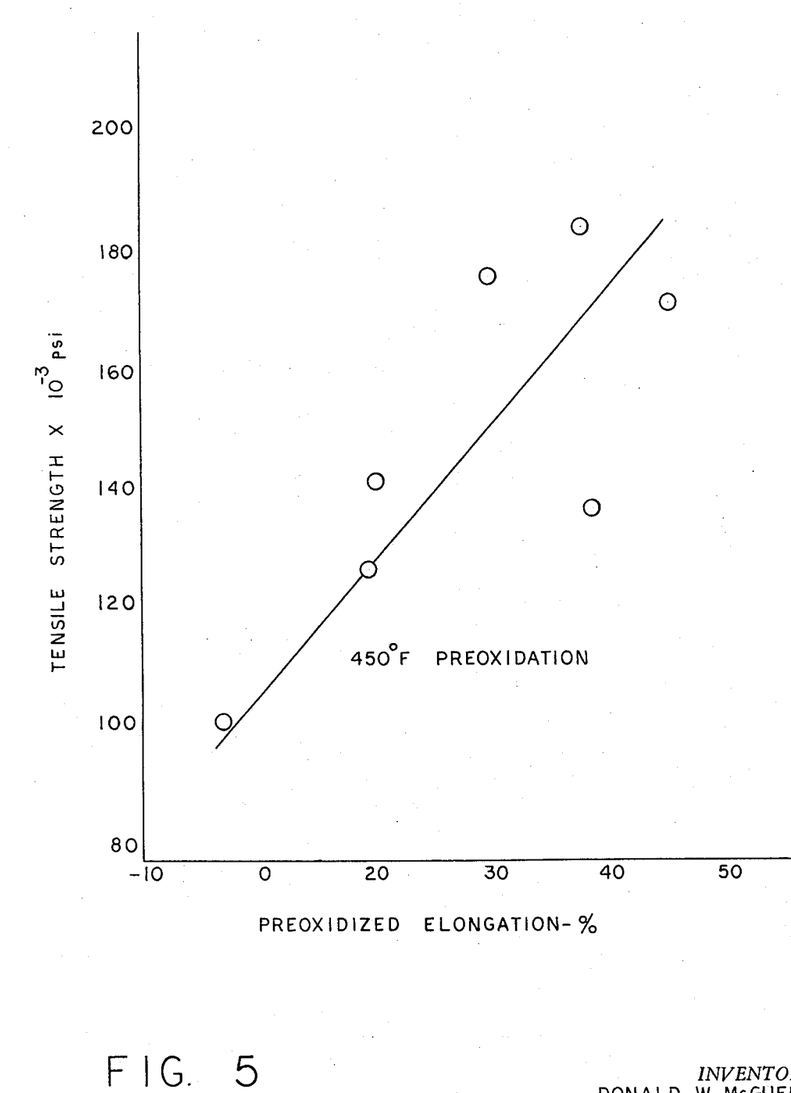
FIG. 5 is a graph showing the effects of elongation during preoxidation on 1,800°F fired material.

Referring now to FIG. 5, the effect of elongation during preoxidation on 1,800°F fired P.A.N. fabric material is illustrated. Increase in strength is attributed to an increase in orientation of the polymer which in turn results in a more oriented carbon fiber with increased strength. A sample of 6 inch fabric tape was continuously stretched and preoxidized and then continuously fired in a globar furnace and then batch graphitized in an induction furnace. The properties of the treated material are shown in the following table.

TABLE II

PREOXIDIZED—STRETCHED MATERIAL

| Characteristics | Material State | |
|---|---|---|
| | Fired | Graphitized |
| Yarn Characteristics | | |
| Tensile Strength—psi $\times 10^3$ | 157–248 | 130–180 |
| Tensile Modulus—psi $\times 10^6$ | 26.3–33.8 | 45–50 |
| Density GM/CC | 1.73–1.80 | 2.08–2.10 |
| Break Strength—lbs. | 6.3–8.2 | 1.3–1.5 |

The process and apparatus of the invention permits continuous processing of pre-woven precursor P.A.N. fabric into a high modulus/high tensile strength fabric in high yield. The fabric can be continuously impregnated with resin to form prepeg materials for forming unidirectional or bidirectional composites. Generally, the composites are formed with phenolics or epoxies containing about 60 to 70 percent of the graphite by volume. For advanced composites in which temperature resistance is more important, other plastics such as polyamides and polyaromatic heterocycles are being used. In typical composite form, the materials are lighter and stiffer than aluminum or steel and are much stronger than aluminum and have a tensile strength about half that of steel. Composite materials are finding many applications in aerospace and sports industries where the combination of lightness, stiffness and strength characteristics are being applied to replace metal and other types of reinforced materials.

It is to be realized that only preferred embodiments of the invntion have been disclosed and that numerous substitutions, modifications and alterations are all permissible without departing from the spirit and scope of the invention as defined in the following claims.

What is claimed is:

1. In an apparatus for continuously producing high modulus, graphite materials, a dynamic orientation and elongation unit comprising:
   a plurality of rolls for receiving an organic precursor fabric on alternating upper and lower surfaces of adjacent rolls;
   first heater means for independently heating each roll at an incremental temperature higher than the preceding roll;
   first temperature sensing means connected to each of said rolls for developing a first signal for controlling the temperature of each roll;
   independent variable speed drive means connected to each of said rolls for controlling the speed of each roll at a higher selected speed than the preceding roll;
   speed means connected to each of said drive means for developing a second signal for controlling the speed of each roll;
   a plurality of intermediate heater means disposed between adjacent rolls for heating the fabric during the travel between rolls; and
   second temperature sensing means for developing a third signal for controlling the temperature of each intermediate heater means at a temperature no less than the temperature of the preceding roll and no more than the temperature of the succeeding roll.

2. An apparatus according to claim 1 wherein alternating rolls are disposed on axial, parallel planes and said planes are separated by at least the radius of the rolls to provide an S-wrap of said fabric through said unit.

3. An apparatus according to claim 2 in which said unit includes from three to eight of said rolls.

4. An apparatus according to claim 2 further including a first control element receiving said first signal and for developing a first control signal applied to said first heater means for controlling the temperature thereof and a second control element receiving said third signal and for developing a third control signal applied to said intermediate heater means for controlling the temperature thereof.

5. An apparatus according to claim 2 further including second control means receiving said second signal and for developing a second control signal for controlling the speed of the preceding roll.

6. An apparatus according to claim 1 in which said rolls are hollow and said heaters each comprise an electrical resistance heater received within said rolls.

7. An apparatus according to claim 1 in which said intermediate heater means comprise means for applying heated gas to said fabric during its travel between adjacent rolls.

8. An apparatus according to claim 7 in which said intermediate heater means comprises an elongated hollow member having a gas inlet, an elongated narrow slot outlet positioned to apply a flow of heated gas to said material and internal heater means disposed within said member for controllably heating said gas to said intermediate temperature.

* * * * *

UNITED STATES PATENT OFFICE
CERTIFICATE OF CORRECTION

Patent No. 3,803,672          Dated April 16, 1974

Inventor(s) Donald W. McGuffin et al

It is certified that error appears in the above-identified patent and that said Letters Patent are hereby corrected as shown below:

Column 1, line 58, "necessry" should read --necessary--. Column 4, line 6, "wrap" should read --warp--; line 16, "or" should read --on--. Column 5, line 37, "fbric" should read --fabric--; line 41 "multi-state" should read --multi-stage--. Column 6, line 61, "THA$_{1-5}$" should read --T$_{HA1-5}$--. Column 9, line 2, "invntion" should read --invention--.

Signed and sealed this 10th day of September 1974.

(SEAL)
Attest:

McCOY M. GIBSON, JR.
Attesting Officer

C. MARSHALL DANN
Commissioner of Patents